March 17, 1964

C. B. WILLIAMS 3,125,207

CONVEYOR TRANSFER APPARATUS

Filed Sept. 18, 1961

INVENTOR.
Carl B. Williams
BY
Nobbe & Swope
ATTORNEYS

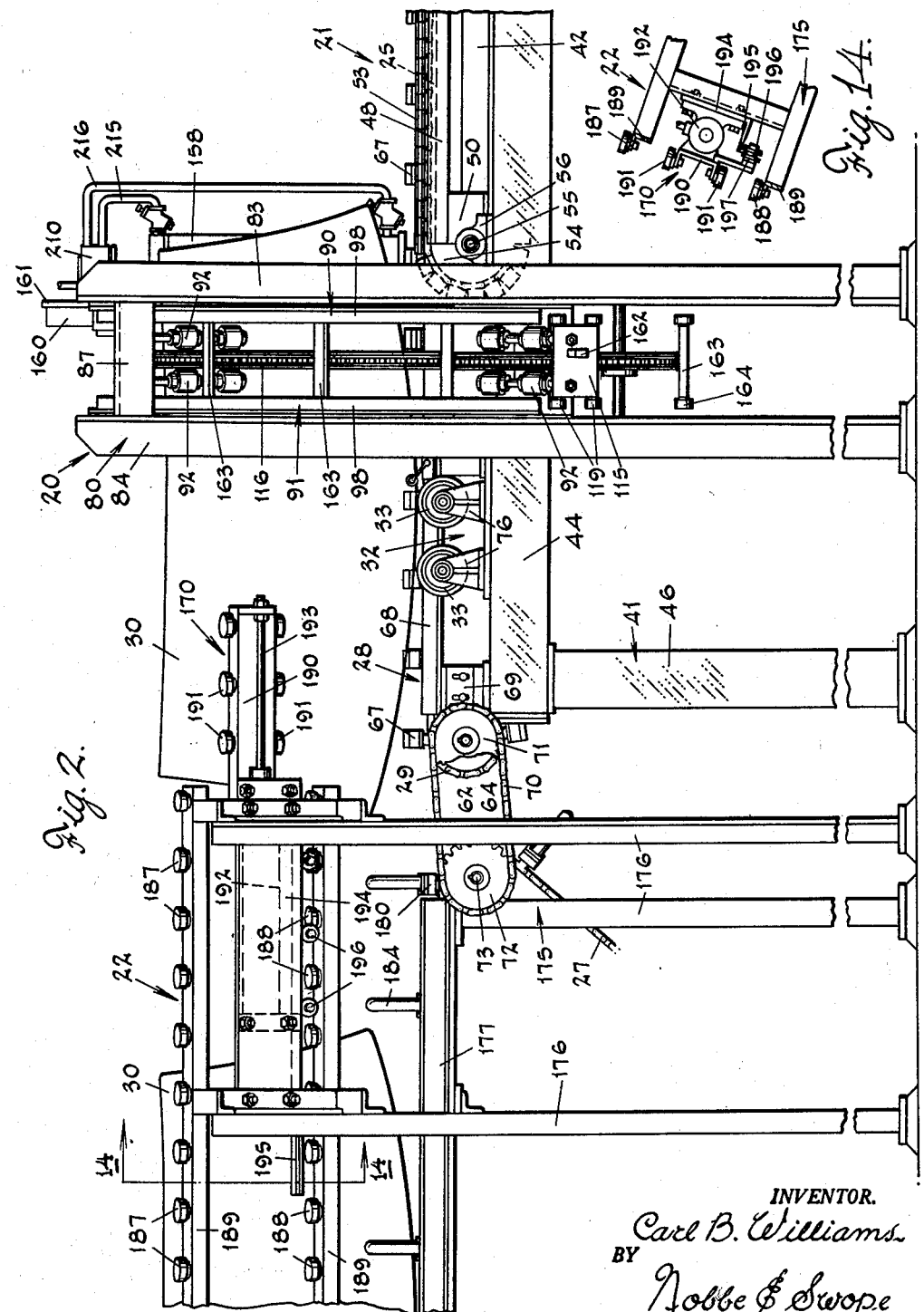

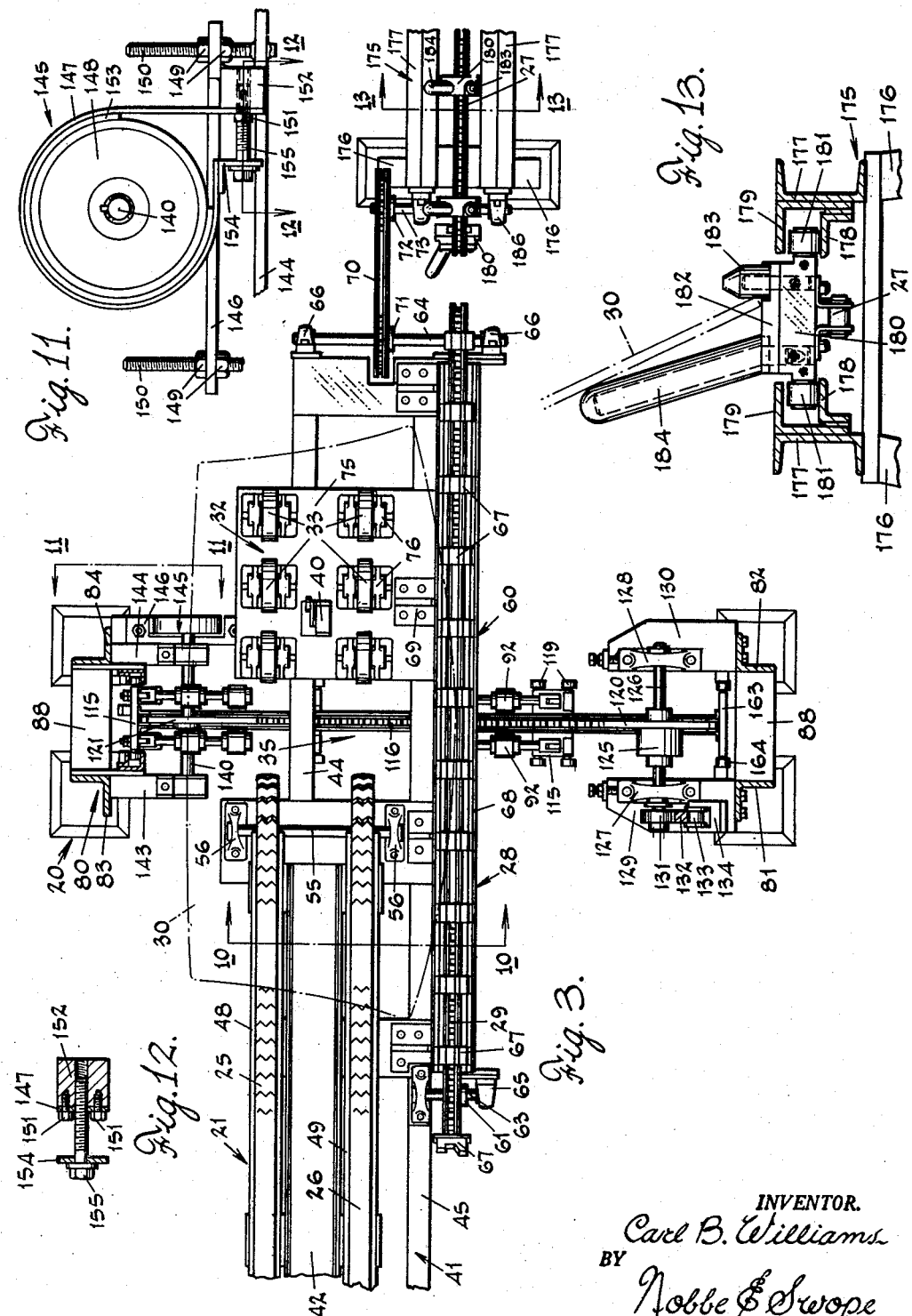

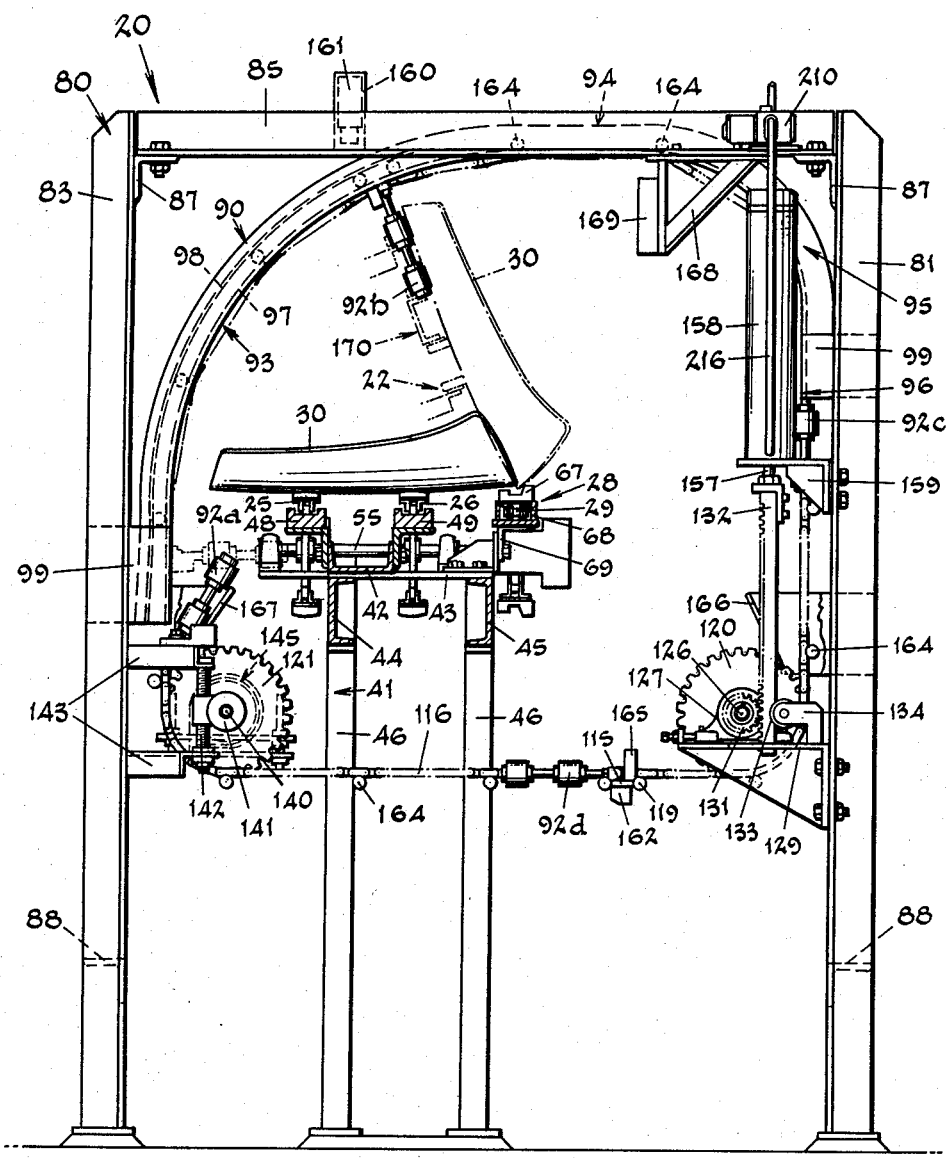

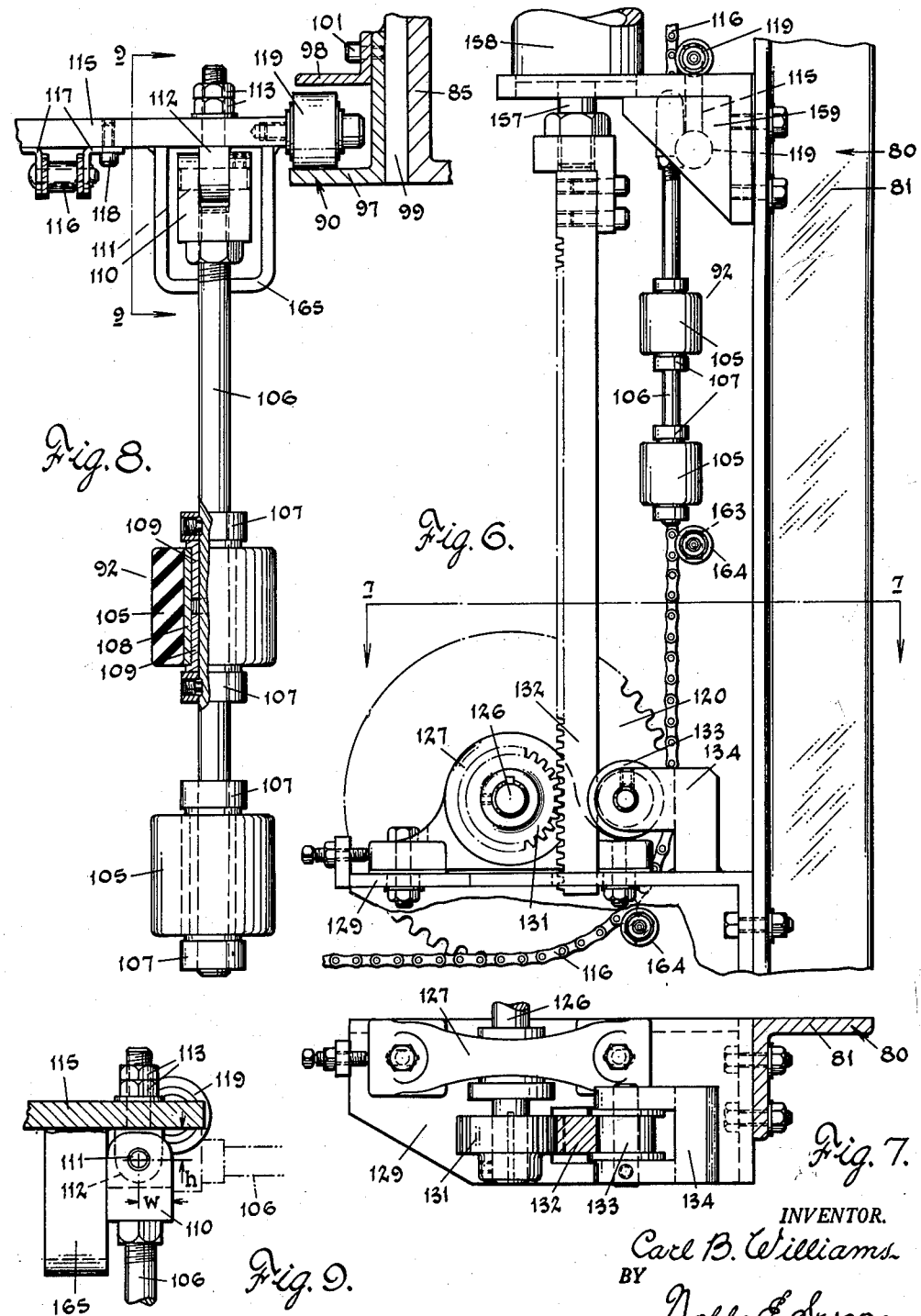

INVENTOR.
Carl B. Williams
BY
Hobbe & Swope
ATTORNEYS

United States Patent Office  3,125,207
Patented Mar. 17, 1964

3,125,207
CONVEYOR TRANSFER APPARATUS
Carl B. Williams, Toledo, Ohio, assignor to Libbey-Owens-Ford Glass Company, Toledo, Ohio, a corporation of Ohio
Filed Sept. 18, 1961, Ser. No. 138,956
9 Claims. (Cl. 198—33)

The present invention relates broadly to apparatus for handling sheet material and more particularly to an improved transfer apparatus adapted to shift the sheet materials from one plane of support to another as the materials are carried along a predetermined path by a conveyor system.

Although not restricted to any particular application or to the handling of any specific type of sheet material the invention has been employed with considerable advantage, and with a significant reduction in labor costs, in the handling of a frangible material such as bent glass sheets and will be hereinafter described in such an embodiment.

Generally stated, the invention is incorporated in a transfer apparatus disposed between two conveyors and adapted to shift the support position of the bent glass sheets as they are moved past the transfer apparatus by the conveyors. For example, in the production treatment of bent glass sheets, it is ofttimes desirable that they be processed during one operation while supported on a conveyor in one position, for instance a horizontal plane, and, at the completion of this operation, that they be shifted to another position, such as a vertical or an inclined plane, on a second conveyor to facilitate further processing.

An important object of the invention is to provide an improved apparatus of the above-described character adapted to change the support position of sheet materials as the latter are advanced along a predetermined path by a conveyor system.

Another object of the invention is to provide improved conveyor transfer apparatus interposed between two adjoining conveyors, with means for automatically transferring sheet materials carried by one conveyor in a horizontal position to an inclined position in which they will be received on a second conveyor.

Another object of the invention is to provide transfer apparatus of the above character which is operated automatically in reponse to the forward movement of each of a plurality of successive sheets.

Other objects and advantages of the invention will become more apparent during the course of the following description when read in connection with the accompanying drawings.

In the drawings, wherein like numerals are employed to designate like parts throughout the same:

FIG. 2 is an elevation of the opposite end of the conveyor transfer apparatus;

FIG. 3 is a plan view taken on line 3—3 of FIG. 1;

FIG. 4 is a side elevation of the transfer apparatus taken on line 4—4 of FIG. 1;

FIG. 5 is a fragmentary top view of the apparatus;

FIG. 6 is an enlarged detail view of a portion of the apparatus as seen in the direction of arrows 6—6 of FIG. 1;

FIG. 7 is a horizontal sectional view taken on line 7—7 of FIG. 6;

FIG. 8 is a detail view of a sheet material lifting device;

FIG. 9 is a vertical transverse sectional view taken on line 9—9 of FIG. 8;

FIG. 11 is an enlarged detail view of a portion of the apparatus as seen in the direction of arrows 11—11 of FIG. 3;

FIG. 12 is a horizontal sectional view taken on line 12—12 of FIG. 11;

FIG. 13 is an enlarged vertical, transverse detail view taken on line 13—13 of FIG. 3;

FIG. 14 is a vertical, transverse sectional view taken on line 14—14 of FIG. 2.

As mentioned above, a conveyor transfer apparatus constructed in accordance with this invention has considerable utility in the continuous processing of bent sheets of glass of the type utilized for laminated automotive windshields or the like. In this procedure, the sheets are subjected to one phase of their processing while supported in a substantially horizontally disposed plane on one conveyor and to further processing while supported in an inclined plane on a second, continuing conveyor. Throughout the processing the sheets are moved continuously along a definite path by the conveyors.

Briefly stated, the transfer apparatus includes a plurality of lifting devices adapted to travel in a vertical plane and along a circuitous path. Operation of the lifting devices is automatically initiated by a bent sheet of glass as it enters the effective area of the apparatus whereupon a lifting device engages the sheet along one marginal edge portion and raises it through an arcuate path, into an angular plane while the opposite edge rests on an interim conveyor section. The lifting device continues to afford support for the sheet substantially until it is received on and supported by the second conveyor apparatus. However since the leading end of the sheet cannot be received on the second conveyor until it is swung upwardly to the desired inclined plane, it likewise must be given adequate free space through which it can be swung upwardly while still being moved forwardly by its supported lower edge. Provision is herein made by a laterally moving conveyor section to afford temporary support; the section moving into supporting relation with the glass sheet substantially simultaneously with its being raised into the inclined plane of its further forward movement on the second conveyor system.

Figure 1:
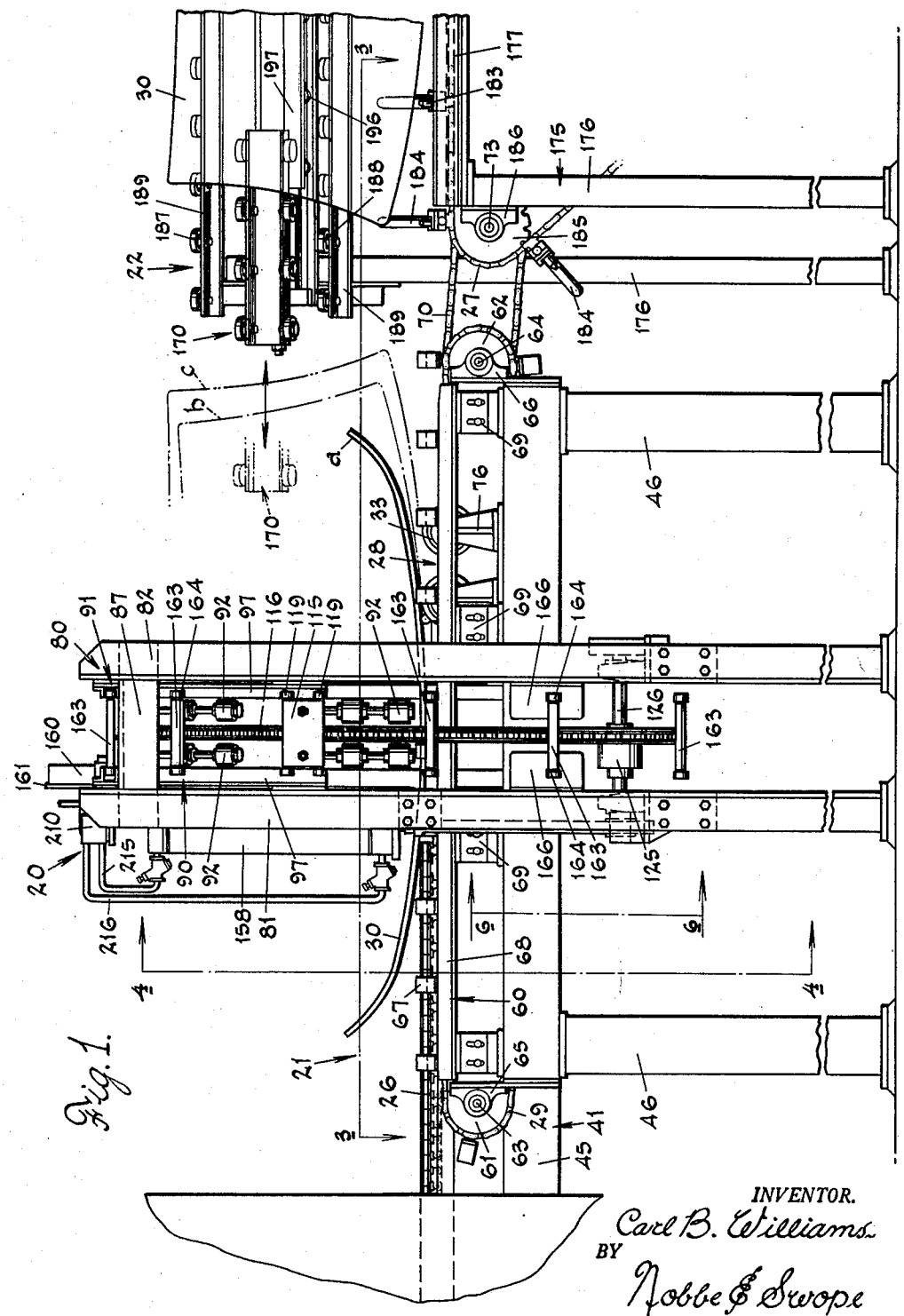
FIG. 1 is an end elevation of a conveyor transfer apparatus, constructed in accordance with this invention and in its installed position in a conveyor system for sheet materials.

Referring now particularly to FIG. 1 of the drawings, the conveyor transfer apparatus constructed in accordance with this invention is generally designated by the numeral 20. Transfer apparatus 20 is interposed between the exit end of a conveyor 21 and the entry end of a conveyor 22. The conveyors 21 and 22, as viewed in plan in FIG. 3, respectively comprise a pair of endless conveyor belts 25 and 26 and a conveyor belt 27. Also as viewed in FIG. 3, there is provided an interim conveyor section 28 having an endless belt 29 moving in overlapping, parallel relation to belts 25 and 26 and in end-to-end aligned relation to belt 27.

The operable area of the transfer apparatus is situated beyond the end of the conveyor 21 and to support a bent glass sheet, such as the sheet 30 indicated in broken line, an auxiliary roll conveyor section 32 is provided. As herein indicated, the leading end of the sheet will be received on rolls 33 of conveyor section 32 while the following end of the sheet is as yet supported on the belts 25 and 26 of conveyor 21. The central area of the sheet is thus unsupported in the open, operable area of the transfer apparatus as indicated by the numeral 35. Also provided on the roll conveyor section 32 is a limit switch 40 adapted to be engaged by the leading end of the sheet and to thereby activate the transfer apparatus to engage the sheet at one marginal edge portion along its central transverse area and raise it into an angularly inclined plane.

Figure 10:
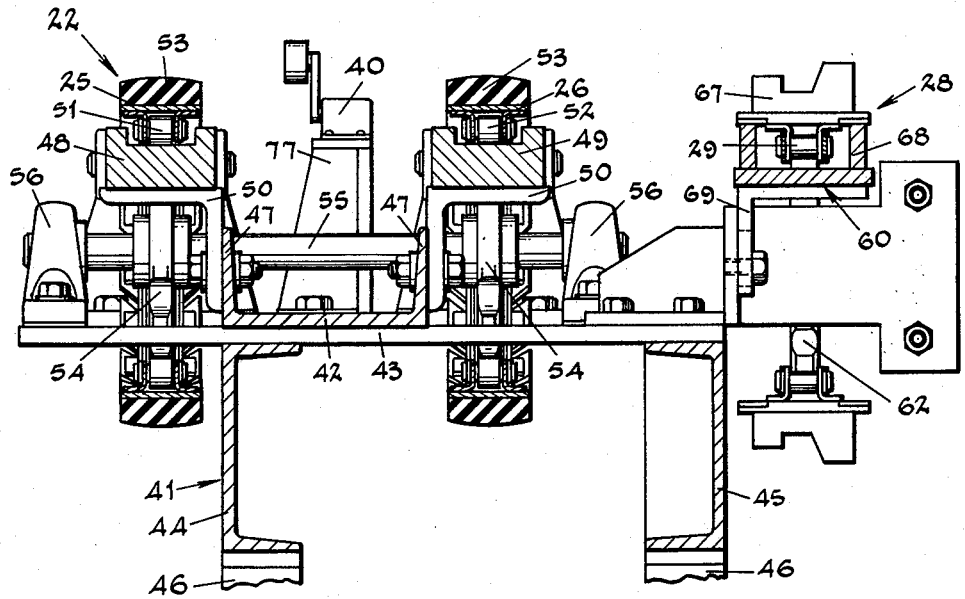
FIG. 10 is an enlarged vertical, transverse detail view taken on line 10—10 of FIG. 3.

More particularly, the belts 25 and 26 of conveyor system 21, as will be best seen in FIGS. 3, 4 and 10, are carried on a structural framework 41 having a channel member 42 mounted by plates 43 on horizontally disposed channel members 44 and 45; said channels 44 and 45 being supported on the upper ends of vertically disposed legs or pedestals 46. On the outwardly directed surfaces of the legs 47 of channel member 42, a pair of tracks 48 and 49 are mounted by means of brackets 50. Each of the belts 25—26 is formed by a sprocket or roller chain 51 and 52, equipped with bent lugs to which are secured suitable blocks 53 of a resilient non-abrasive material, such as rubber, and having interlocking ends and which, as viewed in FIG. 3, afford continuous surfaces for the glass sheets. The end loops of the upper flight of belts 25 and 26, seen in FIG. 2, are trained about sprockets 54 fixed on a free running shaft 55 journaled in bearings 56 mounted on the framework. The belts 25 and 26 are operatively driven from a source of power connected to sprockets associated with their opposite end loops (not shown).

Also mounted on the framework channel 45 is a support structure 60 for the interim conveyor 28 (FIG. 1). For this purpose, the conveyor belt 29 is trained about sprockets 61 and 62 mounted on shafts 63 and 64 (FIG. 1) journaled in bearings 65 and 66. The conveyor belt 29 is provided with regularly spaced, suitably notched blocks 67 of a rubber material and is adapted in its upper flight to traverse a track 68 carried by bracket members 69 on the plates 43 and adjacent leg of channel 45. Also as viewed in FIGS. 2 and 3, the conveyor belt 29 is operatively driven from a source of power originating with the conveyor section 22. This is achieved by a chain belt 70 entrained about sprocket 71 on shaft 64 and a sprocket 72 on shaft 73 associated with the conveyor 22 and supporting belt 27 thereof as will be hereinafter more fully set forth in detail.

The roller conveyor section 32 is supported on a horizontally disposed plate 75 mounted on channel members 44 and 45 in spaced relation to the end loops of belts 25 and 26. By means of journal posts 76, the rubber-tired rollers 33 are mounted with the upper surfaces of their peripheries in a horizontal plane defined by the upper surfaces of the belts 25 and 26. Also by means of bracket 77, the switch 40 is mounted on plate 75.

Now, as viewed in FIGS. 1, 2 and 4, the transfer apparatus 20 includes a framework 80 formed with pairs of vertically disposed columns 81 and 82, 83 and 84, upper horizontally disposed beams 85 and 86 and suitably spaced pairs of braces 87 and 88 arranged between columns 81—82 and 83—84. The columns and beams support a pair of tracks 90 and 91 which are traversed by the aforementioned lifting devices now designated by the numeral 92. As best seen in FIGS. 4 and 8, each of the tracks comprises an upwardly directed curved quadrant section 93, a horizontally disposed section 94, a downwardly directed curved quadrant section 95 and vertically disposed terminal section 96. In quadrant 93, each of the tracks is formed by a pair of suitably curved angles 97 and 98 to afford a double track surface. Angles 98 are provided in the quadrant section 93 from the lower entry end thereof to horizontally disposed track section 94. On the other hand, the angle 97 is continuously formed to also continue through section 94, curved quadrant 95 and vertical section 96. As seen in FIG. 4, track angles 97 are mounted by several plates 99 to the respective columns 81—82 and 83—84 and the beams 85—86. As viewed in FIG. 8, the angles 98 are secured by bolts 101 to their respective angles 97.

In connection with FIG. 8, it will also be seen that the lifting devices 92 comprise a pair of spaced, non-abrasive rollers 105 that are carried by a rod 106 by means of lock collars 107. Preferably the rollers 105 with internal sleeves 108 are freely rotatable relative to flanged sleeve bearings 109; the flanged ends of the bearings being engaged by the collars. At the end of rod 106 opposite the outermost roller 105, a clevis 110 is provided to swingably support the lifting device bodily on an axle 111 mounted in an eye-bolt 112 which is secured by nuts 113 to a carriage 115. As viewed in the drawings, two lifting devices are thus carried by a carriage or base member 115 which is actively associated with continuous sprocket chain belt 116 by means of lugs 117 mounted on certain chain links and secured to said base by bolts 118. The carriage at its opposite ends is equipped with pairs of ball-bearing wheels 119 adapted to traverse the tracks 90 and 91.

As herein disclosed, a plurality of carriages 115, each equipped with a pair of lifting devices 92, are so arranged that during the operative cycle of the transfer apparatus, the lifting devices of one carriage will actively engage, raise and support a sheet of glass during substantially one-fourth of the entire length of path of circuitous travel of the carriage. This path is established by the configuration of the tracks and by the position of two sprockets supported on the framework 80. The sprocket 120 is adapted to drive the chain belt 116 while the sprocket 121 serves as an idler about which the belt moves in an upwardly directed course toward the area of the entry ends of tracks 90 and 91. As shown in FIGS. 3 and 7, the sprocket 120 is mounted by a one-way clutch 125 on a shaft 126 journaled in bearings 127 and 128 on support brackets 129 and 130 bolted to the columns 81 and 82. Outwardly of bearing 127, a pinion 131 is keyed to shaft 126; said pinion meshing with a vertically disposed rack gear 132. Effective meshing relation by the rack 132 is maintained by a "back-up" flanged roller 133 rotatably mounted in a bracket 134 fixed to support bracket 129.

On the other hand, as viewed in FIG. 4, the idler sprocket 121 is mounted on a shaft 140 journaled in bearings 141 mounted on vertical screw shafts 142. The shafts 142 are supported on their ends in brackets 143 and 144 (FIG. 3) secured respectively to columns 83 and 84. The bracket 144, is adapted to also support an adjustably mounted drag-brake device 145 by means of plate 146. As viewed in FIG. 11, the brake 145 comprises a metal strap 147 and a disc-type brake element 148 fixed on the shaft 140. The plate 146 is adapted to be adjusted vertically by nuts 149 carried by threaded posts 150 fixed to the bracket 144. This enables the sprocket 121 to control the tension in chain belt 116 as the shaft 140 is moved by bearings 141 with reference to the screw shafts 142. Since the brake element 148 is also carried by shaft 140, the proper relative position of element 148 and brake device 145 is maintained by similar movement of plate 146 along posts 150 by adjusting nuts 149. The strap 147 of the brake device 145 is attached at one end by screws 151 to a block 152 carried by the plate 146, and is provided with a suitable brake lining material 153 on its inner surface. The opposite end of strap 147 is equipped with a clip 154 for supporting bolt 155 which is threaded into block 152 medially between screws 151. The brake lining material 153 frictionally engages the peripheral surface of the brake element 148 to maintain a constant friction against rotation of the shaft 140 and consequently, through the sprocket 121, the movement of chain belt 116.

Referring again to FIGS. 4 and 6, the rack gear 132 is fixed to the outer end of piston rod 157 of a cylinder 158 the cylinder 158 being mounted by bracket 159 on column 81. Generally stated, the active downward stroke of the cylinder is initiated by the limit switch 40 and the return upward stroke sequentially activated by a limit switch 160 (FIGS. 4 and 5), mounted by plate 161 on beam 85 and engaged by a block 162 carried on each of the carriages 115. During the active downward stroke of the cylinder, the piston rod 157 directively urges the rack gear 132 to revolve the shaft 126 in a clockwise direction, as viewed in FIG. 4, and the clutch 125 is engaged to simultaneously turn the sprocket 120. This operates to move the chain belt 116 and lifting devices 92 through the operative phase of their movement which is terminated by limit switch 160. When action of the cylinder is reversed to draw piston rod 157 and rack gear 132 upwardly, the shaft 126 will be reversely turned but since the clutch 125 disengages, the sprocket 120 does not turn.

When a pair of lifting devices 92 have been caused by movement of chain belt 116 to lift a sheet of glass into the desired angular plane and until the limit switch 160 is engaged, the movement of said chain belt about idler sprocket 121 causes the shaft 140 to turn against the friction of the braking device 145. Thus, when the limit switch 160 is engaged to halt further movement of the chain belt, progress of the several lifting devices 92 is similarly halted and their positions are temporarily stabilized by the action of the braking device. This insures that the subsequently employed lifting devices 92 will be properly located to traverse the desired length of the movement in raising the next glass sheet as it enters the transfer area 35.

The chain belt 116 describes a path horizontally disposed between the sprockets 120 and 121, beneath the channels 44 and 45, and from sprocket 121 upwardly along a course defined by the configuration of tracks 90 and 91 and continuously downward toward and about sprocket 120. In traversing this path, the chain belt carries the lifting devices 92 in generally the same path by the carriages 115 which by wheels 119 traverse said tracks. To suitably maintain the spans of belt 116 between the carriages from becoming objectionably slack or, in the upper flight, dropping from the tracks 90 and 91, support bars 163 are provided and equally spaced between the carriages 115 (FIGS. 2 and 4). Each bar 163 is equipped with oppositely disposed ball-bearing wheels 164 adapted to traverse the tracks 90 and 91 in the same manner as wheels 119.

Referring again to FIGS. 8 and 9, the rod 106 of each lifting device 92 is adapted to swing freely about the axis of axle 111 but is restricted in movement to swing between a position wherein the axis of the rod 106 substantially parallels the chain belt and a second position in which the axis is substantially perpendicularly disposed to the belt. For these purposes, the clevis body 110 in half its width, as at w, in FIG. 9 is equal to the height of axle 111, as at h, from the surface of the carriage. Accordingly as a carriage 115 is moved downwardly from the exit end of tracks 90 and 91 and is carried about the sprocket 120, the weight of the lifting devices will influence the same to swing forwardly and unless otherwise restricted undesirably fall into a downwardly inclined position. This would tend to place them in an outwardly inclined position from which their weight or balance would not permit them to swing into an active position (as shown in full and broken lines) of the lifting devices above sprocket 121. The active or perpendicular position is determined by U-shaped stops 165 secured to the carriage as shown in FIG. 9. Thus, when a pair of lifting devices are positioned to engage and lift a sheet of glass, their respective clevis bodies 110 will rest against the stops 165.

Suitably disposed guide plates 166 on columns 81—82 and 167 on columns 83—84 are provided to control the velocity with which the lifting devices swing between either of their designated positions. As viewed in FIG. 4, the guide plates 166 reduce the tendency of the descending lifting devices to swing as they are moved toward and about the sprocket 120 and until they enter the lower horizontal flight of the chain belt 116 when the respective clevis bodies 110 will rest upon the associated carriage 115. On the other hand, as the lifting devices are carried about the idler sprocket 121 and upwardly therefrom by the chain belt, their swinging action into their operating position indicated in broken line is controlled by the guide plates 167.

As a glass sheet passes over the open area 35 and the leading end thereof engages limit switch 40 while being supported on rollers 33 in conveyor section 32, the cylinder 158 is actuated from a controlled source of pressure to force the piston rod 157 and rack gear 132 downwardly thereby rotating sprocket 120 through clutch 125 and effecting movement of the chain 116. This will advance the carriage and a lifting device 92, as shown in broken line in FIG. 4, upwardly into engagement with the marginal portion of the under surface of the glass sheet adjacent one edge and raise the same to the broken line position thereof at which time the limit switch 160 is engaged as shown in FIG. 5 by an actuator block 162 mounted on each carriage 115. When the forwardly moving sheet is raised from the support of the conveyor belts 25 and 26, the opposed edge of the sheet is tiltingly delivered onto the notched blocks 67 carried by belt 29 of interim conveyor 28. The transfer of the sheet from a horizontal position to a position where it is angularly disposed, and during its continuous movement is indicated at the positions a, b and c in FIG. 1. The position c of FIG. 1 corresponds to the broken line position of a glass sheet in FIG. 4 and this ordinarily is the angular plane in which the sheet moves while transferring from the apparatus 20 to the conveyor system 22. In the event, however, that the momentum of the sheet should cause the same to swing forwardly through a perpendicular plane or upon failure of the limit switch 160 to operate, the sheet could and obviously would fall from its support on the conveyor belt 29. To prevent such inadvertent emergencies, a fixture 168 is secured to each of the horizontal beams 85 and 86 and the inwardly directed surfaces are equipped with resilient pads 169. Accordingly, in the event that a glass sheet would fall forwardly, the upper edge thereof would be caught by the pads 169. And since this transfer area usually serves as an inspection station for the sheets between successive operations, the inspecting personnel would replace the sheet on the apparatus 20 in the broken-line position shown in FIG. 4. Consequently, with a sheet 30 supported in the angularly raised position by the lifting devices 92 (FIG. 4), the movement of belt 29 carries the sheet forwardly toward the conveyor system 22 at the entry end of which an auxiliary roller section 170 is rapidly advanced, as shown in broken line of FIG. 1, to support the sheet and to move therewith as the sheet is carried forwardly from the belt 29 of conveyor section 28 onto the conveyor belt 27 of the conveyor 22.

The conveyor system 22 includes a framework 175 supported on pedestals 176 and comprising a pair of spaced, horizontally disposed channels 177 on the inner vertical surfaces of which a chain track is formed by angles 178 and 179 (FIG. 13). The conveyor 22 includes a conveyor belt 27, the links of which are conventionally equipped with lugs at spaced intervals therealong to which are secured carriage blocks 180. Suitably journaled at the opposite ends of each block 180 are ball-bearing wheels 181. The upper surface of the block is provided with a non-abrasive pad 182 of a material, such as rubber, in which a pair of rubber plugs or fingers 183 and 184 are installed. As viewed in FIG. 13, the rightmost plug 183 is relatively short and is intended to receive the lower edge of a sheet thereagainst, as indicated in broken line. On the other hand, the longer and oppositely disposed plug or finger 184 is inclined to the surface of the block 180 to support the sheet along its rear surface. Due to the spacing between the blocks 180, one or more of the fingers 184 will contact the sheet as it moves forwardly with the conveyor belt 27.

As hereinbefore mentioned, the conveyor belt 27 is generally supported by the shaft 73 and to this end a sprocket 185 is fixed on shaft 73; said shaft being journaled in bearings 186 mounted at the end of framework 175. The belt 27 is thus entrained about sprocket 185 and is driven from a source of power operatively connected to a sprocket about which the opposite end loop of the conveyor belt is entrained. The sprocket 185 and shaft 73 are consequently turned by the belt and the sprocket 71 at one outer end of the shaft will accordingly transmit power to the shaft 64 of interim conveyor section 28 through chain belt 70.

Arranged above and in angularly disposed relation to the belt 27 are two horizontal rows of freely rotatable rollers or wheels 187 and 188. As shown in FIGS. 1 and 2, these wheels are supported on the framework 175 by means of rails 189. The primary roller section 170 of the conveyor system 22 is positioned between the rows of wheels 187 and 188 and includes a frame 190 (FIG. 2), equipped with wheels 191, and which is moved outwardly and inwardly by a cylinder 192 and the piston rod 193 thereof. The terms "outwardly" and "inwardly" are here employed to reduce confusion upon reference to forward movement of a sheet 30 which, as viewed in FIG. 2, is toward the left while movement of the conveyor section 170 to the illustrated position would naturally be toward the right and in a reverse direction to that of the sheet. Therefore it will be understood that the section 170 moves outwardly of framework 175 to support a sheet 30 and then inwardly while moving with the "forwardly" moving sheet. The cylinder 192 is mounted in the framework 175 by means of a base plate 194 which is also equipped with a rail or track 195 (FIG. 14) on which are supported casters 196 mounted on a bar 197 secured to the rear surface of the frame 190.

Figure 15:
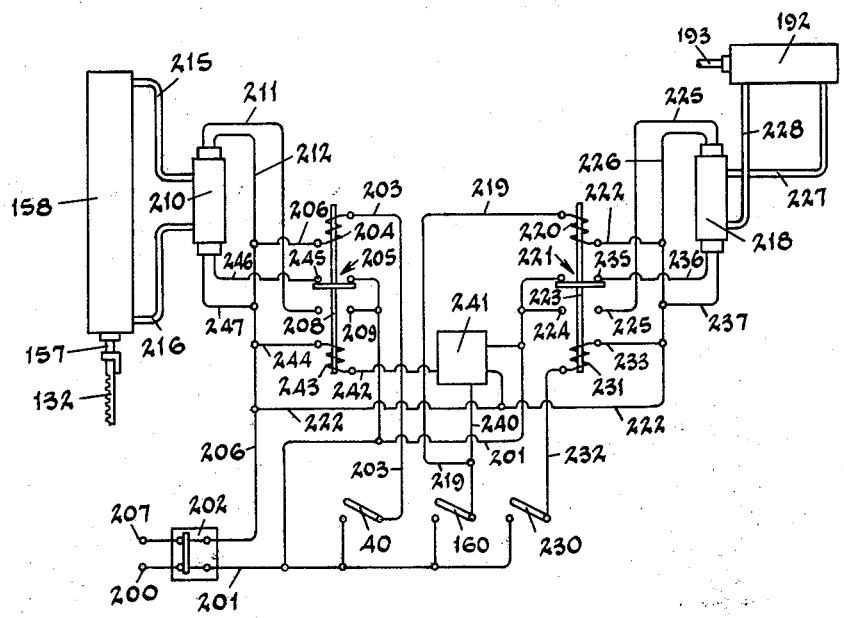
FIG. 15 is a diagrammatic view of an electrical circuitry employed in connection with the conveyor transfer apparatus.

In order that one cycle of the transfer operation can be easily followed in sequence with the required functioning of the necessary switches, cylinders and valves therefor, reference is now made to FIG. 15 wherein a preferred form of electrical circuits and pressure systems has been combined in diagrammatic representation. Now, with a plurality of glass sheets 30 being carried forwardly in horizontal positions on the belts 25 and 26 of conveyor system 21, each sheet in succession at its leading end is moved across the open area 35, in which the operative elements of the transfer apparatus 20 are located, and is received on the rollers 33 of conveyor section 32. The switch 40 located on plate 75 of this section is also contacted to complete an electric circuit from source line 200 by line 201 through one side of control switch 202 and line 203 to solenoid 204 of a double action relay switch 205. This circuit is connected by line 206 to opposite source line 207 through switch 202. The energized solenoid 204 actuates armature 208 to close contacts 209 thus establishing a circuit from line 201 to a solenoid pressure valve 210 through line 211 and thence by line 212 to opposite source 207. Valve 210 directs pressure to the upper end of cylinder 158 via pipe 215; pipe 216 to opposite end of the cylinder being connected through the valve to exhaust. The downwardly moving piston rod 157 and rack gear 132 drive pinion 131 and shaft 126 causing one-way clutch 125 to operatively turn sprocket 120. This course of events moves the chain 116 to produce upwardly directed movement of lifting devices 92a (FIG. 4) from the broken line position thereof into engagement with the marginal area of the bottom surface of the bent glass sheet 30. During continued upward movement of chain 116, the lifting devices 92a will raise the sheet 30 through an arcuate path, determined by the curved quadrant section 93 of the tracks 90 and 91, into the inclined position indicated in broken line. This extent of movement of the lifting devices is terminated when the block 162 on the carriage 115 for the immediate lifting devices engages the actuating lever of switch 160. The previously operative lifting devices 92b during the above described movement of the chain 116 will be advanced along the horizontal section 94, curved section 95 to the presently illustrated position of lifting devices 92c in or beneath the downwardly directed exit section 96 with the devices 92d which are carried forwardly, with the associated portion of chain 116 passing about idler sprocket 121, until the position initially occupied by lifting devices 92a is reached. As aforementioned, when the chain belt 116 is halted, the brake device 145 serves to restrain further activity and stabilizes the positions of the lifting devices.

As the sheet 30 is raised at one marginal edge from the conveyor belts 25 and 26, the opposite edge thereof is received on the notched blocks 67 of conveyor belt 29 of interim section 28; said blocks being supported on the upper surfaces of track 68. During the lifting cycle of the transfer apparatus, the sheet is thus being continuously moved forward from the horizontal position *a* in FIG. 1, through position *b* to the inclined position indicated at *c*.

To support the sheet, still supported along its upper marginal portion by the rollers 105 of the lifting devices 92a, through the necessarily open area between the transfer apparatus 20 and first rollers 187 and 188 of conveyor system 22 and until the lower edge of the sheet is transferred from the blocks 67 of the belt 29 to blocks 180 associated with the conveyor belt 27, the primary conveyor section 170 is moved outwardly by means of the associated cylinder 192.

Activity of the cylinder 192 is controlled by a solenoid valve 218 (FIG. 15). This valve is actuated by an electric circuit originating from line 200 through presently closed switch 160 and line 219 to the solenoid 220 of a double-action relay switch 221 and thence by line 222 to opposite source 207. Energized solenoid 220 operates armature 223 to close contacts 224 to establish a circuit from line 200 to line 225 and one side of valve 218 and thence by line 226 to opposite source 207. Valve 218 directs pressure through pipe 227 to the cylinder 192 with pipe 228 associated with the opposite end of said cylinder, being connected to exhaust through said valve. The piston rod 193 of cylinder 192 thus moves the auxiliary or primary roller section 170 outwardly to the broken line position of FIG. 1. This outward movement of conveyor section 170 occurs substantially simultaneously with termination of operation of the transfer apparatus to the end that the leading end of the sheet 30 will be supported on the wheels 191 of section 170 while the following end of the sheet is as yet supported by the lifting devices 92a. Due of course to the substantially rapid forward movement of the sheet as the moving support for its lower edge is transferred from the belt 29 of interim conveyor section 28 to the belt 27 of conveyor system 22 and the upper marginal portion of the leading end of the sheet is received in rolling contact with the supporting wheels 187 and 189, the necessity for support by the wheels 191 of primary section 170 is gradually decreased so that the section can be moved inwardly in timed relation to forward movement of the sheet.

This is accomplished by closure of a limit switch 230 adapted to be actively engaged by the frame 190 of primary section at the outer extremity of its movement. Switch 230 completes a circuit from line 200 to opposed solenoid 231 of relay switch 221 by line 232 and thence by line 233 to opposite source 207 via line 222. Solenoid 231 actuates armature 223 to close contacts 235 thus establishing a circuit from line 201 and line 236 to opposite side of valve 218 and by line 237 to opposite source 207 via line 222. This will reverse the direction of pressure between the ends of cylinder 192 with pipe 228 carrying pressure and pipe 227 connected to exhaust. Switch 230 is of course opened upon inwardly directed movement of the frame 190. The primary conveyor section 170 is thus returned to its idle position as shown in full line in FIG. 1 and the general electrical circuitry is generally reduced inactive.

However, the switch 160 causes the completion of a further circuit to produce upward movement of piston rod 157 and associated rack gear 132 to position the same relative to the pinion 131 and clutch 125 for subsequent operation. For this purpose, switch 150 by branch 240 from line 219 completes the activating circuit to a timing device 241; said device being in series with service lines to sources 200 and 207. After a time interval of adjusted duration, timing device 241 completes a circuit from line 200 by line 242 to opposed solenoid 243 of relay switch 205 and thence by line 244 to opposite source 207 via line 206. Armature 208 thereby opens contacts 209 and causes a circuit to be established through contacts 245 from line 200 to line 246, opposite side of valve 210 and thence by line 247 to opposite source 207 by way of line 206. Reversal of valve 210 directs pressure through pipe 216 to the lower end of cylinder 158 with oppositely attached pipe 215 being connected to exhaust. The resulting upward movement of piston rod 157 causes rack gear 132 to turn pinion 131, shaft 126 and one side of clutch 125 in a counter-clockwise direction (FIG. 6). Since the clutch is disengaged during this reversal of shaft rotation, mounted sprocket 120 is not affected and chain belt 116 remains stationary due to the action of brake device 145. When the timing device 241 is rendered inactive, the electric circuits of the transfer apparatus in their entirety become idle.

It is thus believed apparent that the conveyor transfer apparatus 20 is adapted to receive sheet materials, such as bent sheets of laminated glass, while supported in a horizontal position on one conveyor, such as the conveyor system 21, and to automatically raise each sheet in succession into a plane inclined to the vertical while moving said sheet forward in a continuous motion. At the entry end of the adjoining conveyor section 22, the primary section 170 is adapted to move laterally outward into an area through which the leading end of the sheet is raised by a pair of lifting devices 92 and to then support the leading end while the following end of the sheet is still in roll contact with the lifting device. This insures that the sheet at its otherwise unsupported leading end will not fall rearwardly but will be adequately supported until a major portion of the sheet is received on the wheels 187 and 188. During this time, the lower edge of the sheet is fully supported as it is transferred from the belt 29 of the interim conveyor section 28 onto the belt 27 of the conveyor system 22.

It is to be understood that the form of the invention herewith shown and described is to be taken as a preferred embodiment of the same, and that various changes in the shape, size and arrangement of parts may be resorted to without departing from the spirit of the invention.

I claim:

1. Transfer apparatus for use between two conveyors disposed in substantially aligned end-to-end relationship to transfer sheets delivered to the apparatus by one of said conveyors while supported in one plane to the other of said conveyors wherein the sheets are supported in a plane angularly disposed to said one plane, said transfer apparatus comprising an interim conveyor disposed between adjacent ends of said two conveyors, means disposed adjacent one side and intermediate the ends of said interim conveyor for engaging and lifting an adjacent edge of a sheet resting on said interim conveyor and rocking it about an opposite edge as an axis from said one plane to said angularly disposed plane and to support said sheet in said angularly disposed plane as it is advanced toward said other conveyor by said interim conveyor, and means responsive to the movement of sheets along said one conveyor for actuating said engaging and lifting means.

2. In apparatus for transferring sheet material supported in a horizontal plane on a first conveyor to a second conveyor substantially longitudinally aligned therewith and adapted to support the sheet in an inclined plane, the combination of, an interim conveyor disposed between the adjacent ends of said first and second conveyors in longitudinally aligned relationship with said second conveyor and parallel to said first conveyor, said interim conveyor overlapping said first conveyor and being adapted to receive one edge portion of the sheet supported on said first conveyor and advance it toward said second conveyor, means disposed intermediate the ends of said interim conveyor for engaging an opposite edge portion of the sheet while supported in said horizontal plane and rocking it upwardly about said one edge portion and into said inclined plane and to support said sheet in said inclined plane until the sheet is received on said second conveyor, and means responsive to the movement of said sheet along said first conveyor for actuating said engaging and rocking means.

3. For use in combination with first and second conveyors disposed end to end and adapted to carry sheet material along a predetermined path with the sheets being supported on the second conveyor in a plane angularly disposed to the plane in which the sheets are supported on the first conveyor, a transfer apparatus disposed between adjacent ends of said first and second conveyors and comprising an interim conveyor longitudinally aligned with said second conveyor and parallel to said first conveyor, said interim conveyor overlapping said first conveyor and being adapted to receive one edge portion of the sheets supported on said first conveyor, rollers aligned with said first conveyor and journaled to rotate about axes extending parallel to the plane of support of said sheets on said first conveyor, an endless belt guided for endwise movement in a plane extending normal to said first conveyor plane of support, lifting devices carried by said belt and operable to engage an opposite edge portion of said sheets supported on said first conveyor and said rollers and to rock said sheets about said one edge portion supported on said interim conveyor into said angularly disposed plane, the sheets being supported in said angularly disposed plane by said lifting devices as they are carried by said interim conveyor to said second conveyor.

4. Apparatus for transferring sheet material from one end of a first conveyor supporting a sheet in one plane for movement along a predetermined path to an adjacent end of a second conveyor substantially longitudinally aligned therewith and supporting the sheet in a plane angularly disposed relative to said one plane, comprising an interim conveyor extending parallel to said first and second conveyors and disposed between adjacent ends thereof in overlapping relationship with said first conveyor, said interim conveyor being adapted to receive thereon a marginal edge portion of the sheet to be transfered, rollers disposed between adjacent ends of said first and second conveyors and journaled to rotate about axes extending parallel to said one plane of support and being adapted to support the major portion of said sheet leaving the end of said first conveyor, an endless chain disposed between said first and second conveyors and guided for endwise movement in a plane extending normal to said planes of support, lifting devices carried by said endless chain and operable to lift the opposite edge of said sheet and pivot it about said one edge into said angularly disposed plane and support it in the latter plane as the sheet is moved by said interim conveyor to the adjacent end of said second conveyor.

5. In apparatus for transferring sheet material moving along a first conveyor while supported in a fixed plane to a second conveyor substantially longitudinally aligned with said first conveyor and adapted to support the sheet in a plane angularly disposed relative to said fixed plane, the combination of an interim conveyor disposed between adjacent ends of said first and scond conveyors, an endless chain guided for endwise movement along a path encircling said interim conveyor and lying in a plane normal to said fixed plane and said angularly disposed plane and extending transversely of said conveyors, means carried by said chain to engage an edge portion of said sheet and to swing said sheet about an opposite edge thereof as an axis into said angularly disposed plane and to support the sheet in said angularly disposed plane as it is advanced by said interim conveyor toward said second conveyor and until said sheet is received on said second conveyor.

6. In apparatus for transferring sheet material as defined in claim 5, in which said lifting means comprises a carriage mounted on said chain, an elongated bar pivotally mounted at one end of said carriage to swing between an operative position wherein said bar extends perpendicularly inwardly from said chain and inoperative positive wherein said bar extends substantially parallel to said chain, and sheet engaging rollers journaled on the other end of said bar.

7. In apparatus for transferring sheets as defined in claim 5, in which said endless chain moves intermittently endwise in one direction, power means driving said chain, switching means actuating said power means in response to movement of said sheets along said interim conveyor to advance said chain along said path thereby to move said lifting device between said fixed plane and said angularly disposed plane, and second switch means responsive to the movement of said chain to deactivate said power means when said lifting device carries said sheet to said inclined plane.

8. In apparatus for transferring sheets as defined in claim 5, in which means are provided on the adjacent end of said second conveyor to move toward and away from said transfer apparatus and being operable to support the leading edge of a sheet carried by said interim conveyor toward said second conveyor until said sheet is received on said second conveyor.

9. Transfer apparatus for transferring sheet material supported in a horizontal plane on a first conveyor to a second conveyor substantially longitudinally aligned therewith and adapted to support the sheets in an inclined plane, said transfer apparatus being disposed between adjacent ends of said first and second conveyors and comprising an interim conveyor, arcuate track means extending upwardly and across said interim conveyor adjacent one side thereof, an endless chain guided by said track means for endwise movement in a vertical plane extending transversely of said interim conveyor intermediate the ends thereof, lifting means carried by said endless chain and adapted to engage an adjacent edge portion of the sheet supported on said interim conveyor and to rock said edge portion upwardly about an opposite edge portion into said inclined plane and to support the sheet in said inclined plane as it is moved by said interim conveyor toward said second conveyor.

References Cited in the file of this patent
UNITED STATES PATENTS
421,385     Chambers _____ Feb. 18, 1890